Aug. 10, 1943.  D. E. O'BEIRNE  2,326,250
BEE OBSERVATION UNIT
Filed Aug. 19, 1941  3 Sheets-Sheet 2
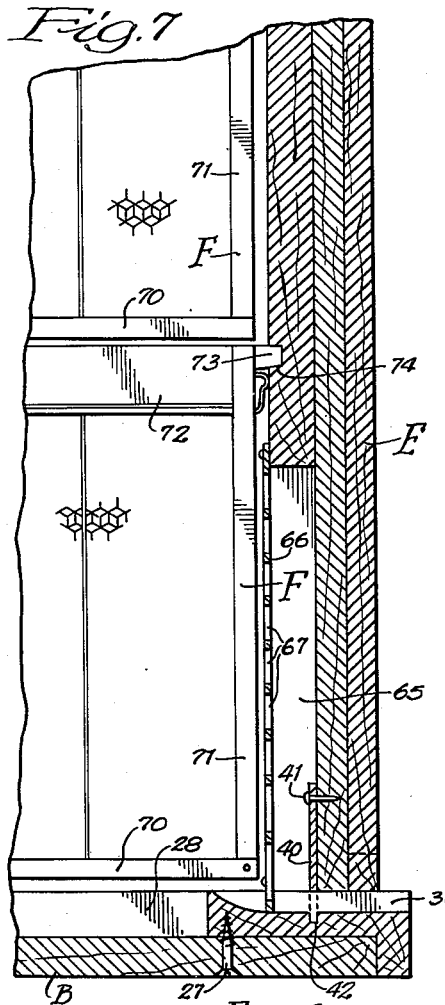
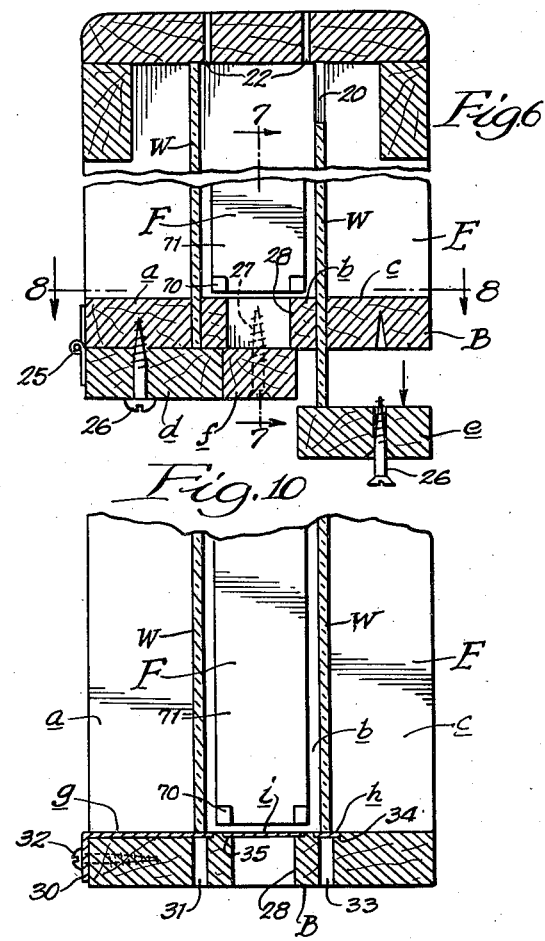
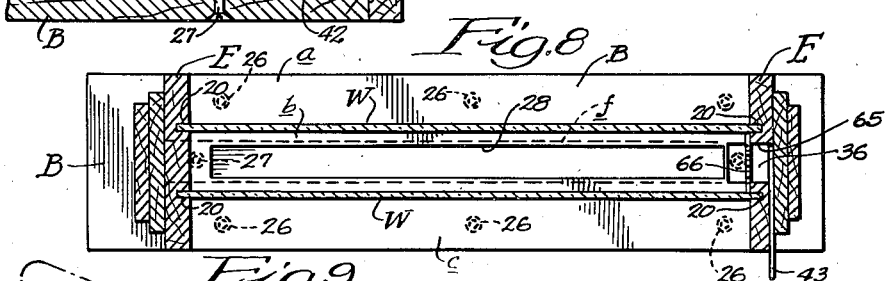
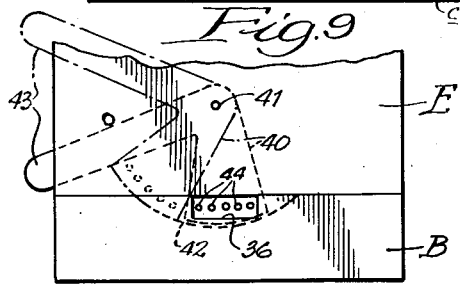
Inventor:
Donald E. O'Beirne.
By Cumming & Cumming
Attorneys.

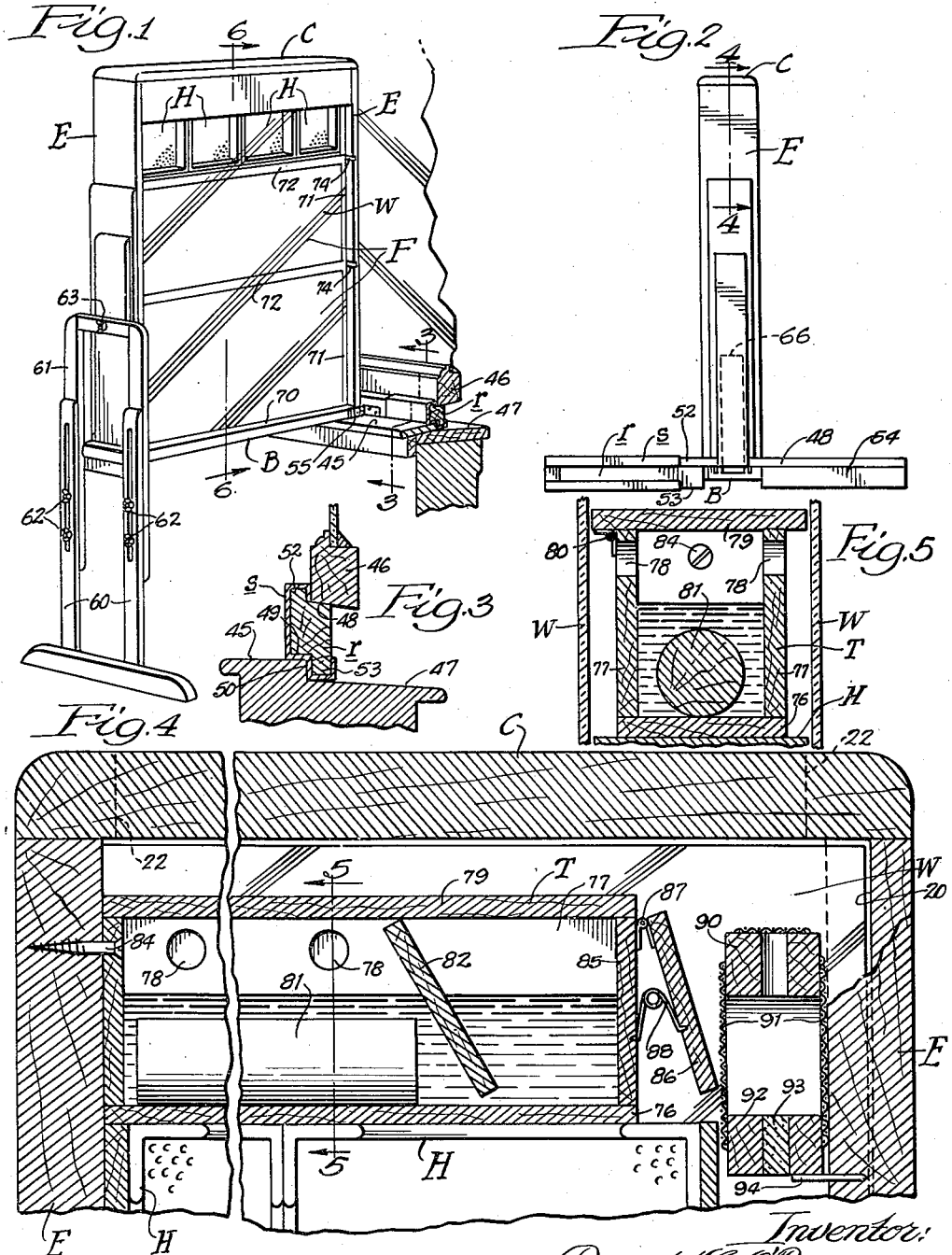

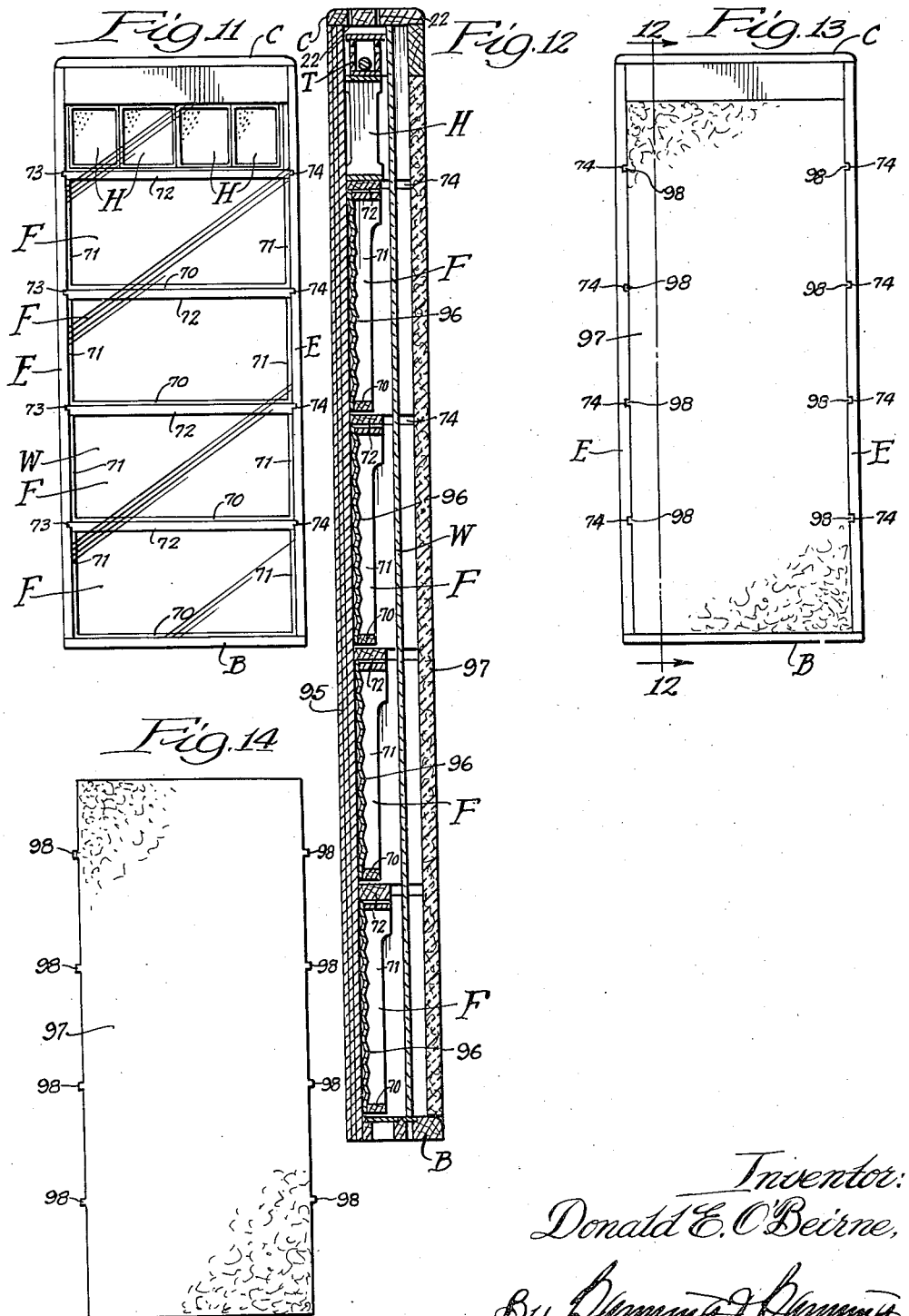

Patented Aug. 10, 1943

2,326,250

UNITED STATES PATENT OFFICE 2,326,250

BEE OBSERVATION UNIT

Donald E. O'Beirne, Waukesha, Wis.

Application August 19, 1941, Serial No. 407,434

13 Claims. (Cl. 6—1)

The present invention relates to a bee observation unit. This is a type of confining enclosure or cage in which a colony of bees may carry on their life functions completely exposed for study and observation by interested persons. Such an observation unit serves a useful purpose in class rooms and other places where members of the public may gather to receive visual instruction or first-hand information respecting bee life.

The present observation unit incorporates in its structure various improvements which facilitate the requisite servicing of the cage for a prolonged and healthy life of the bee colony which is confined therein. These improvements comprise a simplified and more effective feeding trough, including the means by which it is rendered accessible for convenient refilling; a compartment in which may be placed a cage containing a queen bee preliminary to her acceptance by the worker bees of the colony; a mounting for one or more glass sides within the structure, so made as to permit free and ready removal of such sides by a downward movement through the bottom of the unit; a central elongated opening through the unit bottom, normally closed, but readily openable to permit the fitting thereto of the mouthpiece of a container from which bees may be released for admission into the confining enclosure; a feed trough which is amply ventilated and readily accessible for the movement of the bees in and out thereof, together with means therewithin whereon the bees may stand while feeding; a queen excluder plate in conjunction with a vertical recess at one end of the confining enclosure and above a runway through which bees may pass in and out of the cage, the plate promoting the collection of droppings on the outside of the recess which remains clear in consequence so that passage into and out of the unit may not be impeded; and an independent support for each of the several honeycomb and brood frames within the unit, the same support also cooperating with an insulated cover which may be releasably fitted in place to protect the bees from a lowering temperature exteriorly of the enclosure.

These various features of construction, as well as others which will hereinafter appear, characterize the present bee observation unit of which certain preferred embodiments are illustrated in the accompanying drawings in the manner following:

Figure 1 is a perspective view of the present bee observation unit mounted in a window, the latter being shown in vertical section;

Fig. 2 is a rear end elevational view of the observation unit;

Fig. 3 is an enlarged detail in section, taken on line 3—3 of Fig. 1;

Fig. 4 is a fragmentary vertical section, taken on line 4—4 of Fig. 2;

Fig. 5 is a fragmentary transverse section, taken on line 5—5 of Fig. 4;

Fig. 6 is a fragmentary transverse section, taken on line 6—6 of Fig. 1;

Fig. 7 is a central vertical section, taken on line 7—7 of Fig. 6;

Fig. 8 is a horizontal section, taken on line 8—8 of Fig. 6;

Fig. 9 is a detail in elevation of the closing device which coacts with the runway at the front end of the unit;

Fig. 10, which is a view similar to Fig. 6, shows a modification in the bottom construction of the unit;

Fig. 11 is a side elevation of an observation unit of modified construction;

Fig. 12 is an enlarged vertical transverse section, taken on line 12—12 of Fig. 13;

Fig. 13, which is a view similar to Fig. 11, shows an insulating board fitted to the observation unit; and Fig. 14 is a view in elevation of the insulation panel which is attachable to the structure of Fig. 13.

An observation unit which embodies the present improvements is made up of front and rear end walls E upstanding from opposite ends of a bottom B to support at its upper end a cover or closure C. As a material suitable for such a construction I contemplate using boards of wood or plywood. In the facing sides of the end walls are formed vertical grooves 20, two in each case, spaced apart an equal distance, to receive therein edge portions of transparent sides forming windows W which extend continuously from the top to the bottom of the unit. An enclosed space is thereby provided for the reception of the honeycomb and brood frames as will shortly be described.

The unit cover is removably fitted in place so as to afford access to the unit from its upper side. As shown, it is provided with a plurality of slots or openings 22 affording ventilation to the enclosed space therebelow. The bottom of the unit comprises by preference three sections a, b and c, each extending the full length thereof and connected at its extremities to the end walls E. The middle section b is separated from the others a distance about equal to the thickness of the transparent sides W, the spaces thus provided being in register with the windows so as to accommodate therein the lower edge portions thereof, as shown in Fig. 6. A support for the lower edge of each window is also provided in the manner presently to be explained, and when the support is withdrawn the window resting thereon is free to slide downwardly and be disassembled from the remaining structure. If this operation is to take place during bee occupancy of the unit, then a follower slide (not shown) is introduced through the top while the cover is open to take up concurrently within the grooves the position which is vacated by the descending glass side. In this way, the bees are assured of continued confinement while either or both of the transparent sides undergo removal, and also, by a repetition of the operation, a subsequent replacement.

In Fig. 6 I have shown a strip $d$ connected by a hinge 25 to the bottom board $a$ thereabove. This strip may be swung to an upper position where it affords support to the window thereabove, and locked in this position as by screws 26, a hook or otherwise (not shown). If desired, a different type of support may be afforded for the other window as by a strip $e$ which underlies the bottom section $c$ and adapted for removable securement thereto as by a plurality of screws 26. This strip is shown as slightly separated from the bottom board $c$ the same as it would appear when being removed therefrom, the supported window then being free to lower itself, as shown, while undergoing removal from the unit. Between the two strips $d$ and $e$ is a wide space adapted to be closed by a center strip $f$ which is removably fastened to the unit bottom as by screws 27 which traverse end portions thereof. Above this center strip $f$ is a slotted opening 28 through the bottom board $b$, affording an elongated entrance passageway. Through this opening bees may be introduced into the cage. In such an operation the center strip $f$ is first removed, and then a container having a mouthpiece adapted to cooperate with this entrance passageway is fitted thereto whereupon the bees are free to ascend into the cage where they may thereafter be trapped by replacement of the center strip $f$.

In Fig. 10 I have shown a bottom construction in which the strips $d$, $e$ and $f$ are dispensed with and in lieu thereof I utilize metallic plates $g$, $h$ and $i$, respectively. As shown, the plate $g$ is adapted to overlie the bottom and underlie one of the windows so as to provide support therefor. This plate is formed with a depending flange 30 which, when in engagement with the proximate side of the bottom, limits the inward movement of the plate to the distance that is desired. In this position the plate overlies a slot 31 through which the proximate window W is free to descend when the plate $g$ is shifted laterally upon the bottom. Any suitable fastening means, such as a screw 32, may be employed to releasably secure the plate in place. The other window W lies immediately above a second slot 33 extending through the bottom, but is normally prevented from dropping therethrough by the metal strap $h$ which is slidably received within a recess 34 in the upper face of the bottom. The strap extends lengthwise of the bottom and is slidably removable therefrom by an endwise movement so as to free the window for descent through the slot 33. Between the plate $g$ and strap $h$ is another recess 35 in the upper face of the bottom. This accommodates the plate $i$ in the form of a slide which extends lengthwise of the bottom upon the upper face thereof immediately above the center slot 28 to provide a closure therefor. When pulled out by an endwise movement an entrance to the interior of the enclosed space thereabove is provided so that bees may be introduced into the observation unit in the manner previously described. Any or all of these several forms of bottom supports for the windows may be employed, their characteristic feature being removability so as to free each window for descent through the slot in the bottom. With the window taken away, the interior of the bee observation unit is made accessible for cleaning, repair or other work, thereby facilitating the service that may occasionally be required if a colony of bees is to be maintained in healthy condition over a prolonged period of time.

The slot 28 extending lengthwise through the bottom terminates short of the forward end thereof (see Fig. 7) where I have provided in the upper face of the bottom a runway 36 which proceeds inwardly from its forward extremity, continuing to a point short of the slot 28. Through this runway bees are permitted to move freely in and out, except as restricted by a closing device of which one form is shown in Fig. 9. Here it will be observed that I employ an arcuate plate 40 pivoted as at 41 and adapted to swing across the runway 36 within an arcuate slot 42. Extending laterally from this plate is an arm 43 forming a handle which is accessible from the outside of the unit (see Fig. 8). By manipulation of this handle the arcuate plate may be shifted to a position in which it lies across the runway to prevent passage of bees therethrough; or it may be adjusted to any of several other positions in which the runway is obstructed only partly or not at all, whereby movement of bees through the runway may be regulated, as desired. Desirably the arcuate plate is provided with a plurality of small openings 44 affording ventilating passages so that, when in closed position, air may enter at this point into the enclosed space within the observation unit.

One of the most convenient locations for installation of the present occupation unit is at a window in a building structure. With the observation unit placed within a room, but with its runway exposed to the air outside, the bees are free to leave the unit in search of food and in pursuance of their other life activities. To adapt the unit for installation at windows, which may vary widely as to size, I find it advantageous to employ an adjustable adapter, as best shown in Figs. 1-3. Here I have illustrated an inside sill 45 upon which is rested the bottom of the unit adjacent its forward end. If the window be of the sliding sash type, as is usual, the latter will be raised to the point that its bottom rail 46 occupies a position definitely above the outside sill 47 which is usually down-set to lie in a lower inclined plane. Within the space thus provided below the sash is received an extensible adapter which, as shown, comprises a rail $r$ which is rabbetted along its upper outside face to provide a recess 48 within which may be received the lower inside corner portion of the sash rail 46. The adapter rail $r$ is further rabbetted to provide a second recess 49 along its under and inside face wherein may be received the stop shoulder 50 that is usually formed at the point of downset between the upper inside sill and the outside lower sill where the lower sash rail takes up its position when the sash is fully closed. With an adapter rail of such construction, I associate a metal sheathing s which extends around the offset shoulders 52 and 53 which are formed along the upper and lower edges thereof, this sheathing following the contour of the adapter rail, being slidable lengthwise thereupon, and having a normally inseparable interlock therewith.

When the bee observation unit is installed at the window, the extensible adapter rail with its associated sheathing is fitted between the lower rail of the sash and sill therebelow, as clearly shown in Figs. 1 and 3, so as to close off the opening between the room and the air outside. An adapter rail of this character is extended laterally from the bee unit, and preferably one only need be provided. From the opposite side of the unit is extended another rail 54 (preferably of cross-sectional form the same as the rail r) which continues on to the end of the window opening so that the observation unit may occupy a position intermediately of the stiles of the sash. One or both of the rails r and 54 may be connected to the forward end of the observation unit as by a hinge 55 so that the rail is free to swing alongside of the observation unit when the latter is to be removed for storage purposes, or to be shipped to its destination. At all other times, however, each hinged rail is swung out or positioned so as to extend lengthwise across the sill to furnish a closure for the space which underlies the opened sash, the only entrance through that space being that which is opposite the runway 36 where provision is made for the bees to move in and out.

The opposite end of the bee observation unit which extends inwardly into the room should desirably be supported from the floor. For this purpose I have shown a stand comprising a pair of upright legs 60 having an associated extensible frame 61 together with bolts extending therebetween and through elongated slots in one of them, each bolt being equipped with a clamping nut 62 whereby to secure the frame in a desired vertical adjusted position relative to the stand. The frame may be connected to the bee observation unit at the rear end of the latter as by a bolt 63. In this way a simple adjustable support may be provided for the bee observation unit at its inner end so that the unit will be maintained at all times in a level position as required by the height of the sill on which its forward end is rested.

The forward end wall of the unit is formed along its inside face with a slot 65 extending upwardly from its lower end which is in communication with the runway 36. This slot, as shown, proceeds upwardly for a substantial distance and is closed over by a queen excluder plate 66 having openings 67 of a size which will restrain a queen bee from passing therethrough. Worker bees are free to ascend or descend through the slot and through the plate openings 67 so as to pass therethrough into the space within the observation unit. This excluder plate extends at its lower end into the runway 36 and bees passing therethrough may select for this purpose any of the plate openings 67, either those adjacent the bottom of the unit, those near the top of the plate, or any of the others in between.

In the construction shown in Fig. 1, two brood frames F are accommodated within the unit, one above the other, and each extending for the full distance between the two ends thereof. Each frame comprises a bottom rail 70, end rails 71 rising therefrom, and a top rail 72 having a lug 73 projected horizontally beyond each opposite end thereof. Each lug is adapted to lie within a slot 74 that extends transversely within the inside face of the end wall so as to afford a suspension support for the entire frame of which it is a component. To position each frame in place, one of the windows is first removed. The upper of the two brood frames which may be identical with the lower is similarly supported within its own cross slot 74, and in slightly spaced relation to the brood frame therebelow, so as to be freely removable independently thereof.

Above the brood frames are arranged a plurality of honeycomb frames H extending horizontally across the unit. These several honeycomb frames may, if desired, be fastened together and be secured within the bee observation unit in any desired manner. They occupy a position which is spaced from the unit cover C so as to permit of accommodation of a feeding trough T which will now be described.

As shown, this trough is formed with a bottom 76 and spaced sides 77 through which are openings 78 slightly below their upper edges, a cover 79 being extended over the tops of the sides and, if desired, hingedly connected as at 80 to one of them. The width of this cover is substantially that of the space between th two windows, but the trough sides 77 lie inwardly thereof to provide space for movement of bees upwardly through the openings 78 and through to the inside thereof. By this arrangement the bees are prevented from ascending upwardly beyond the cover, while afforded access to the trough just below this cover. Within the trough is a bar 81 which may rest upon the trough bottom to afford a perch or rest for the bees while feeding within the trough. Liquid food is poured into the trough, usually to a level above the bar, but not so high as to deprive the bees of support from the bar while feeding.

As shown in Fig. 4, the trough may be positioned above the honeycomb frames to extend from a point close to one end of the unit toward its opposite end, terminating short thereof to permit positioning of a partition 82 which extends downwardly from just below the cover to a point slightly spaced from the trough bottom. When the cover is open, the end space within the trough beyond the partition is exposed to receive liquid food which may then pass under the baffle wall to fill the entire trough. This space, however, is too small to permit bees to crawl thereunder, consequently they are confined to that portion of the trough which is removed from the inlet end thereof. The openings 78 are also confined to the same space as that which is occupied by the bar 81, consequently bees are unable to advance beyond the partition so as to emerge from confinement.

One end of the feed trough may be fastened, as by a screw 84 to the proximate end E of the unit, the opposite trough end being closed by a wall 85 beyond which is a space adapted to be bridged by an extension proceeding from the trough end, here shown as a lid 86 hinged as at 87 and normally urged to a closed position by a spring 88. This extension lid extends crosswise of the space between the enclosure sides W so as to provide a closure which will prevent bees from moving up beyond the honeycomb frames into the space above the feed trough. When this lid is pushed downwardly, the space beyond the trough end wall 85 is adapted to receive a cage 90 having, if desired, foraminous sides 91 and a bottom 92 through which is a vertical passageway adapted to be closed by a plug 93 of candy or the like. When this cage is introduced in place, it comes to rest against a stop pin 94, the lid then pushing against one side thereof to hold the cage against the end wall of the observation unit. If a queen bee, confined within the cage, be accepted by the worker bees within the unit, the candy plug will be eaten away, thereby freeing the queen bee to enter into the space therebelow to take up the usual life activities which characterize a colony of bees.

The description up to this point has reference particularly to the showings in Figs. 1–10 inclusive, although many of the features of construction therein shown may be incorporated into the modified form of unit which is illustrated in Figs. 11–14. It will be understood, therefore, that insofar as appears from like reference characters the parts in the two constructions of observation units are the same so that further detailed description thereof may be abbreviated.

The observation unit now to be described, and shown more particularly in Figs. 11–14, is one that is adapted particularly for a wall or inside mounting where observation of the bee colony life is feasible from one side only of the unit. A primary characteristic of a unit adapted for use in such an environment is that it be provided with a transparent pane W on one side only, the rear or side 95 being closed by a backing as of plywood or other appropriate material.

The end walls E of the observation unit under description are provided with transverse slots 74 upon their inner facing surfaces to receive lugs 73 which are projected beyond the ends of the top rails of brood frames F whereby the latter may be individually, independently, and removably suspended therein. In each of the brood frames the wax foundation 96 is positioned at the rear, adjacent the side 95, instead of in an intermediate position, inasmuch as the bees will build out cells only in a direction which is toward the light. Because of the resulting reduced number of cells, the frames should desirably be of about twice the usual size so that the wax foundations will be of double area. Since it is possible that such an observation unit will be placed in a room where there is a wide variation in temperature during each twenty-four hours, as for example in a stove-heated building, it is desirable that means be provided for protecting the bees within the unit against a drop in temperature which usually occurs over each nightly period. For this purpose I have provided an insulating board 97 from opposite edges of which project lugs 98 each adapted to fit within one of the transverse grooves 74 when the board is fitted in place. With the board removed for exposure of the bees behind the single glass pane W the structure will appear as represented in Fig. 11. The board itself is shown in Fig. 14 and when applied in place the observation unit will appear as shown in Fig. 13. The relationship of the board to the remaining parts with which it cooperates is indicated best in Fig. 12. With such a construction, a connection (not shown) is made with the runway at one end of the observation unit adjacent its bottom to a point exteriorly of the building so that the bees will have opportunity to move in and out as required for their normal colony life.

The bee observation unit of this invention is designed with a view to the confinement of the bees behind a window in an enclosure wherein normal colony life may be carried on under normal conditions. To accomplish this, the present structure provides adequate facilities for a functioning colony of bees, as distinguished from a mere display container wherein the confined bees will survive for only a few days at most. It will be noted, among other things, that I have provided for one or more glass sides, slidably fitted in place, and removable vertically so as to permit a follower slide to occupy concurrently the position vacated by the slide which is withdrawn. Also, without disturbance to the bee colony, the central elongated slot in the bottom, when uncovered, provides an opening through which additional bees, or an entire new colony, may be introduced without involving any disturbance of parts interiorly of the enclosure. According to the arrangement herein disclosed, provision is made for the introduction from the top of a queen cage without opening up any passages through which worker bees may escape, this cage being freely removable after acceptance and release of the queen bee. The feed trough which lies immediately below the top cover of the structure is so made as to permit (1) replenishment of liquid food, and (2) bees to enter at all times thereinto, but not to escape from the enclosing structure except through the runway provided for that purpose.

A further point of advantage is the provision of a recess extending vertically behind the queen excluder plate at one end wall of the enclosure. Experience has shown that by the provision of such a partial barrier over a vertical passageway, the bees will tend to drop refuse, dead bodies, etc., to the outside thereof without attempting to carry such matter into the recessed passageway through the openings in the excluder plate. The result is that these droppings fall conveniently to the outside of the recess where they are picked up from time to time for removal through the lower openings in the excluder plate to points exteriorly of the enclosure. In this way an unobstructed and a cleaner passageway is maintained behind the excluder plate at all times for the vertical movement of bees into and out of the enclosure.

The adapter rail hereinbefore described has the merit of being inexpensive to produce, easy to install, and effective to close the entire opening (save for that part through which the front end of the unit is extended) between the window sill and the sash rail thereabove. A complication arises when the sill is downset and the closure, in consequence, is extended upwardly from two levels. The metallic sheathing which is slidably interlocked with the adapter rail provides, in effect, an extension piece that is adjustable lengthwise, as required, to occupy a desired length of the space to be closed; and its contour which conforms to that of its cooperating rail furnishes the requisite interlock as well as two oppositely extending offset shoulders which coact with the sill and sash to render the closure truly weather-tight.

The improvements which are incorporated into the present bee observation unit are such as to facilitate, and also minimize, the care and attention that is requisite for the maintenance of a healthy and prolonged life of a colony of bees within the enclosure. Whatever need be done in the way of supplying food, removing debris, cleaning out, etc., can be attended to effectively and simply, so that the operations required for maintenance may be easily and successfully looked after.

I claim:

1. A bee observation unit in the form of an enclosing structure having a bottom and at one side an observation opening grooved along its opposite ends in register with a slot through the bottom, a transparent side receivable through the bottom slot and upwardly movable therethrough to be guided by and supported within the opposite grooves in the ends, a top closure for the enclosing structure movable to expose the grooves upon their upper extremities, and means movably associated with the bottom for sustaining the transparent side in a fixed position to complete the enclosure and adapted, in a second position, to permit the transparent side to slide vertically for movement through the bottom and adapted to permit movement of a follower slide downwardly while guided within the same end grooves.

2. A bee observation unit in the form of an enclosing structure having a movable top, two ends and a bottom and at one side an observation opening, there being an elongated slot through the bottom communicating with the space within the enclosing structure, a plurality of frames suspended within the structure off of the bottom, a transparent side slidable through the bottom slot to occupy a closure position within the observation opening at the side of the enclosing structure, the top when moved affording access to a descending slide to occupy the position vacated by the transparent side, and closure means for the bottom slot removably associated therewith, free and clear of the suspended frames thereabove, and furnishing a releasable sustaining support for the transparent side thereabove.

3. A bee observation unit in the form of an enclosing structure having spaced sides with a removable cover thereover and therebelow a feed trough which extends lengthwise within the structure from one end thereof toward the other but short thereof to provide beyond one end of the feed trough an open space within the structure along one end thereof, the sides of the feed trough being spaced inwardly from the proximate sides of the structure, a cover for the feed trough extending for substantially the full width between the sides of the structure, means forming an extension for the trough cover and movable relative thereto to close or open the space beyond the feed trough end, a queen cage receivable within the space beyond the end of the feed trough when the cover extension is moved to open position, the cage being provided with a releasably plugged opening communicating with the space therebelow, and means for supporting the queen cage in a fixed position within the open space at one end of the feed trough.

4. A bee observation unit in the form of an enclosing structure having spaced sides with a removable cover thereover and therebelow a feed trough which extends lengthwise within the structure from one end thereof toward the other but short thereof to provide beyond one end of the feed trough an open space within the structure along one end thereof, a cover for the feed trough, means forming an extension for the trough cover and movable relative thereto to close or open the space beyond the feed trough end, a queen cage receivable within the space beyond the end of the feed trough when the cover extension is moved to open position, the cage being provided with a releasably plugged opening communicating with the space therebelow, and means for supporting the queen cage in a fixed position within the open space at one end of the feed trough.

5. A bee observation unit in the form of af enclosing structure having spaced sides with a removable cover thereover and therebelow a feed trough which extends lengthwise within the structure from one end thereof to provide beyond one end of the feed trough an open space within the structure along one end thereof, a cover for the feed trough, means forming an extension beyond the feed trough cover and movable relative thereto to open or close the space beyond the feed trough end, a queen cage receivable within the space beyond the end of the feed trough when the cover extension is moved to open position, the cage being provided with a releasably plugged opening communicating with the space therebelow, and means for supporting the queen cage in a fixed position within the open space at one end of the feed trough.

6. A bee observation unit in the form of an enclosing structure having spaced sides with a removable cover thereover and therebelow a feed trough which extends lengthwise within the structure from one end thereof to provide beyond one end of the feed trough an open space within the structure along one end thereof, a cover for the feed trough, means forming an extension for the trough cover comprising a hinged trap door swingable to a horizontal position to close the space beyond the feed trough or to a vertical position to open the space beyond the feed trough end, a queen cage receivable within the space beyond the end of the feed trough when the cover extension is moved to open position, the cage being provided with a releasably plugged opening communicating with the space therebelow, and means for supporting the queen cage in a fixed position within the open space at one end of the feed trough.

7. A bee observation unit in the form of an enclosing structure having vertical ends each formed with a guide facing the other, a transparent side slidably received within and adapted to be supported by the guides at the ends, a cover for the enclosure extending for the full distance between the ends and movable to a position for exposure of the top edge of the transparent side whereby to permit such side to be slid vertically into and out of its supported position within the guides, a bottom for the structure below the transparent side having a slot through which the side may be slid vertically for removal from or insertion into the structure, and means cooperating with the bottom and movable with respect thereto adapted to underlie the side to furnish a sustaining support therefor whereby to normally maintain the side in a fixed position above the bottom.

8. A bee observation unit in the form of an enclosing structure having a movable top and vertical ends between which is an observation opening, a plurality of brood frames suspended between the ends and movable into and out of the enclosure through the observation opening, a transparent side receivable within the window opening to complete the enclosure therebehind, means forming a lateral support for the side at opposite ends thereof, a bottom for the structure below the side having a slot through which the side may be vertically slid into or out of the structure, the top when moved to one position also permitting a follower slide to enter into the space occupied by the side upon vacancy thereof, and means cooperating with the bottom and movable with respect thereto to furnish a sustaining support therefor whereby to normally maintain the side in a fixed position above the bottom.

9. A bee observation unit in the form of an enclosing structure having an end wall with a vertically extending recess on its inner face in communication with a bottom runway which extends horizontally from within the enclosure to a point exteriorly thereof, and a perforated queen excluder plate fitted over the recess and extending downwardly to lie within the runway whereby worker bees are permitted to pass through the plate openings at various elevations for movement into and out of the confining structure, the runway extending inwardly to a point beyond the excluder plate whereby to catch droppings from points adjacent the inner face of the excluder plate.

10. A bee observation unit in the form of an enclosing structure having an end wall rising from a bottom wherein is a horizontal runway extending from within the enclosure to a point exteriorly thereof, a perforated queen excluder plate extending upwardly from a point adjacent the runway and in slightly spaced relation to the end wall except at the top and sides of the plate where it lies adjacent the end wall, providing therewith a vertical passageway rearwardly of the plate through which worker bees may pass at various elevations for movement into and out of the confining structure.

11. A bee observation unit in the form of an enclosing structure having end walls rising from a bottom wherein is formed a runway which extends horizontally from within the enclosure to a point exteriorly thereof, and a vertically extended perforated queen excluder plate having its lower end adjacent the enclosure bottom and disposed in spaced relation to one end wall except along its side and top edges where it is in substantial adjacent relation therewith, the queen excluder plate defining with the end wall a vertical passage to which access may be had at the bottom through the runway leading to a point exteriorly of the structure and at points above the bottom through the openings within the plate whereby worker bees may pass through such openings at various elevations for movement into and out of the confining structure.

12. A bee observation unit in the form of an enclosing structure having a pair of spaced ends and therebetween fixed rear side and, opposite thereto, an observation opening, a transparent side receivable within the observation opening and movable thereto or therefrom, means for normally securing the transparent side in a fixed position for closure of the observation opening, a plurality of brood frames independently supported within the enclosing structure in spaced relation to the transparent side when fixed at the observation opening, a foundation wall associated with each brood frame and positioned adjacent the rear wall of the supporting structure to permit the building of cells outwardly therefrom toward the transparent side, the several frames being spaced from the transparent side a distance which permits of bees moving upwardly past all the frames to a point adjacent the top of the enclosing structure, a feed trough above the topmost frame within the supporting structure, the feed trough having an apertured wall spaced from the transparent side of the enclosing structure permitting bees to pass up and along such wall and through the openings therein to feed within the trough, and a cover and extension therefor associated with the feed trough extending between its apertured wall and the transparent side and between the two ends of the structure to provide a closure at that point against further upward movement of the bees therewithin, and a removable cover for the enclosing structure permitting access, when opened, to the feed trough but without opening up any passage for the movement of bees upwardly therebeyond.

13. A bee observation unit in the form of an enclosing structure having a top, a bottom, ends extending therebetween connected to the top and bottom and formed with vertical guides, and at one side an observation opening, there being through the bottom a slot in register with the guides, a brood frame supported between the ends adjacent the guides, a transparent side receivable through the bottom slot and vertically movable therethrough to be guided by and supported within the guides in the ends in a position proximate to but spaced from the brood frame, and means movably associated with the bottom for sustaining the transparent side in a fixed position to close the observation opening and adapted, in a second position, to permit the transparent side to slide vertically for passage through the bottom.

DONALD E. O'BEIRNE.